July 29, 1941.  P. C. GOLDMARK  2,250,479
SYSTEM FOR BUILDING VOLTAGES FOR DEFLECTING CATHODE RAYS
Filed Dec. 10, 1936  3 Sheets-Sheet 2

INVENTOR.
Peter C. Goldmark
BY
Watson, Bristol, Johnson & Leavenworth
ATTORNEYS.

July 29, 1941.   P. C. GOLDMARK   2,250,479
SYSTEM FOR BUILDING VOLTAGES FOR DEFLECTING CATHODE RAYS
Filed Dec. 10, 1936   3 Sheets-Sheet 3

INVENTOR.
Peter C. Goldmark
BY Watson, Bristol, Johnson & Leavenworth
ATTORNEYS.

Patented July 29, 1941

2,250,479

UNITED STATES PATENT OFFICE 2,250,479

SYSTEM FOR BUILDING VOLTAGES FOR DEFLECTING CATHODE RAYS

Peter C. Goldmark, New York, N. Y., assignor to Markia Corporation, New York, N. Y., a corporation of New York Application December 10, 1936, Serial No. 115,113

11 Claims. (Cl. 178—7.2)

This invention relates to a system for building voltages for deflecting cathode rays, and more particularly to a system which employs a commutator for building scanning voltages to a plurality of different values that may be applied to a cathode ray tube for deflecting the cathode ray in accordance with a desired scheme for image scanning and analogous purposes.

The invention has for its object generally an improved construction and arrangement of apparatus for obtaining scanning voltages of successively different values that change abruptly in a convenient and expeditious manner whereby a relatively small amount of apparatus is required.

More specifically, the invention has for its object the provision of an improved system supplied directly from a plurality of sources of constant potential instead of from electron discharge devices for giving the constant components of a plurality of scanning voltages; any varying component that may be desired being supplied additionally in a standard manner.

Another object is to provide a system of the character indicated which uses mechanical means, such as a commutator, for giving an irregular saw-toothed scanning current for television and like purposes; the irregularity recurring at cyclic intervals.

Still another object is to provide a system employing mechano-electric means, including a commutator as a substitute for a photoelectric device with an associated chopper and amplifier, in order to obtain an irregular saw-toothed scanning voltage for film scanning purposes, such as described in my prior copending application, Serial No. 72,009, filed April 1, 1936.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which.

In the scanning of an image, for example, that on a film which contains picture frames, by means of a cathode ray tube for the purpose of transmitting a facsimile thereof, the problem is presented of driving the apparatus from a source of periodic current so as to scan the image in frames at a rate which can be received and reproduced in standard television apparatus. One solution has been proposed in my copending application above referred to, in which a 60-cycle driving current is employed for actuating the apparatus, and in which provision is made through suitable harmonic multipliers to get scanning voltages at frequencies which will scan a desired number of lines per frame at a rate which appears to give a desired number of frames, for example 24, per second. In the system of that application, the desired harmonics are obtained by means of a photoelectric cell and light chopping device that is driven by a motor run from a commercial source of periodic current. To get the desired scanning voltages the photoelectric impulses are suitably amplified.

In the practice of the present invention, a simplified means for giving the desired scanning voltages is provided. Here, it is proposed to use a mechano-electric means driven with periodic current from any suitable source, for example, a crystal oscillator, or a commercial source of alternating current, and moving in synchronism with the film-movement for effecting direct connections with a plurality of constant potential sources for desired intervals of time in order to supply the various deflecting voltages whereby the cathode ray is moved to scan the image or moving film at a rate giving a desired number of lines per frame and a desired number of frames per second.

The irregular but cyclically varying scanning voltage, which causes the cathode ray to scan horizontal lines in a position such that a desired number of frames appear to be scanned in a given time, may be resolved into two component voltages which are impressed simultaneously upon the deflecting means that produces the vertical deflection of the cathode ray in a tube arranged to scan a downwardly moving film. One of these components has a constant value during a brief period, at the end of which it abruptly changes to another constant value, and so on, in a desired sequence during each period of the group comprising the scanning cycle, after which these changes repeat themselves. The varying component in such case varies in a regular way and is combined with each constant component so as to give the desired scanning voltage.

Figure 1:
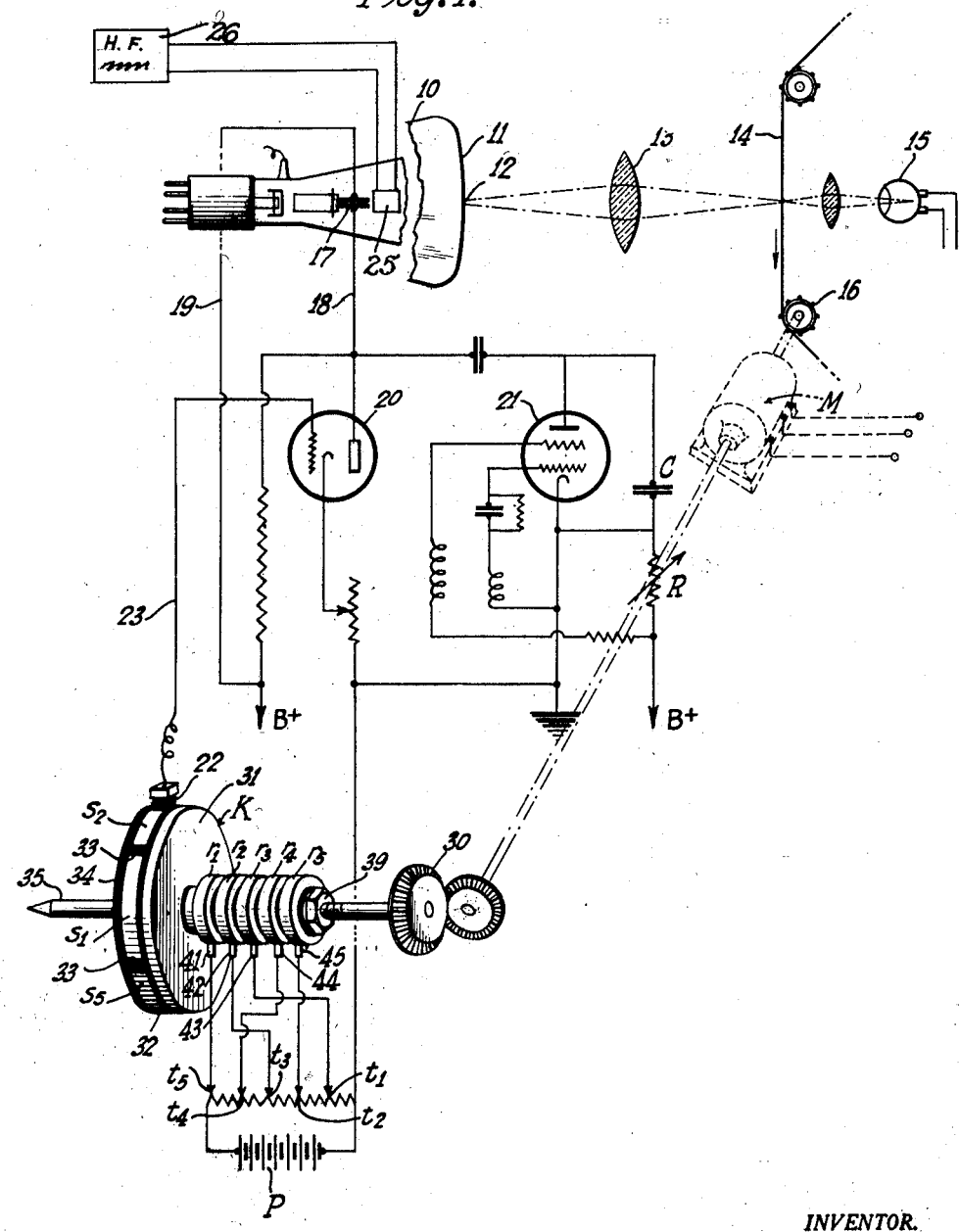
Fig. 1 is a view showing diagrammatically a system supplying scanning voltages to a cathode ray tube in accordance with the invention.

Referring now to the drawings, and particularly to Fig. 1, 10 denotes a cathode ray tube (parts being illustrated as broken away in the interests of clearness of illustration in the drawings) of the type which has a fluorescent screen at 11 on which a moving light spot 12 is produced by the impingement of the cathode ray in order to provide a scanning light source. The light from this source is collected and projected by means of a suitable optical system, here indicated as comprising a lens 13, through the film 14 into a suitable light-sensitive pick-up device, such as a photocell 15. The film is moved in a uniform manner by means of driving sprockets 16, the sprockets in turn being driven by any suitable means, for example, an electric motor, supplied with a periodic current, and shown in broken lines at M. Any suitable source of periodic current that is of relatively constant frequency may be employed, such as a 60-cycle commercial alternating current. A crystal controlled oscillator, however, may be preferred where constancy of frequency is a desideratum. A convenient form of crystal controlled oscillator comprises an oscillator coupled to a filter tuned to give a periodic current of 60 cycles. This, in turn, is supplied to a phase-splitter and these currents supplied to a suitable phase-multiplying transformer, such as a Scott transformer, from which three-phase current for running motor M may be had.

The cathode ray tube 10 has deflecting means, shown as comprising a pair of plates 17 which produce the vertical deflection of the cathode ray, in order that the light spot may be at the proper height relative to the film 14 when being scanned. The horizontal deflecting plates 25 are energized by a suitable saw-tooth oscillator 26 at line-scanning frequency, in conventional manner. The vertical deflecting means is energized from a suitable source of mechanically varied potential through conductors 18 and 19, the former of which leads directly to a terminal connected with sources of the constant and variable voltage components, here shown as the plate elements of tubes 20 and 21, respectively. The tube 20 is arranged to supply the several constant components and to this end has its grid element connected to be controlled by a commutator shown generally at K. The variable component is supplied by means of the tube 21 which has a timing circuit comprising impedance elements C and R arranged to discharge the tube at predetermined intervals. The commutator at K is shown as provided with an angularly adjustable brush or collector 22 (details being shown in Fig. 3) that applies the voltage collected through the conductor 23 to the grid element of the tube 20, the collector picking up voltages of different values from the series of commutator segments in the commutator. The number of segments may be any desired number which give the desired number of constant components. The connection of the segments is such as to give the proper potentials in a desired sequence. The angular adjustment permits the voltage to be impressed in the proper phase.

Figure 4:
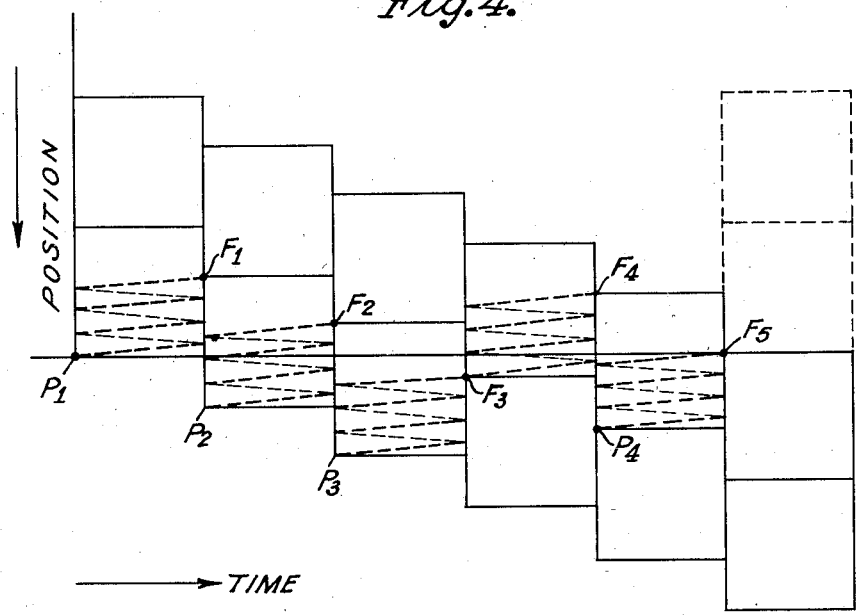
Fig. 4 is a diagrammatic view of the successive positions of frames on a film for which it is desired to provide scanning voltages by the system shown in Fig. 1.

The value and the sequence of the components, which give the vertical scanning deflecting voltage which moves the cathode ray to effect the scansion desired in my aforesaid application, may be determined by analysis from Fig. 4, which discloses the scanning scheme of my aforesaid application, the source of periodic current being taken as a 60-cycle source. Here, in accordance with the scheme, two frames are scanned in the interval which comprises a scanning cycle giving the effect of scanning 24 frames per second, that is, in a cycle that is $\frac{1}{12}$ second long. This scanning cycle is also a convenient multiple of the period of one cycle of the periodic driving current, where a 60-cycle current is employed. The consecutive position of the two frames being scanned when moving downward during each of the five driving current cycles comprising the group of periods making $\frac{1}{12}$ second is shown in Fig. 4. For convenience, it will be assumed that the cathode ray begins to scan the lower frame at a point marked $P_1$, the scansion of the frame being completely accomplished when the cathode ray has been gradually deflected upwardly to a position marked $F_1$. This upward travel of the cathode ray for a distance less than a frame length compensates for the downward movement of the film which takes place at a regular rate. Any standard number of lines, for example, 343, may be put in in this fashion. When the cathode ray concludes the scansion of the lower frame at point $F_1$, the cathode ray is suddenly dropped to position $P_2$ to accomplish the scansion of the lower frame a second time during the next driving current cycle, the scansion of the frame being concluded when the cathode ray has reached the point $F_2$. In accordance with the scanning scheme of the aforesaid application, the cathode ray is again dropped to a position $P_3$ when it accomplishes the scansion of the lower frame for a third time and arrives at the end of the third driving current cycle at a point $F_3$. The upper frame has now reached a position where scansion of it may be conveniently started. During the fourth driving current cycle this is accomplished, at the end of which period the cathode ray reaches the point $F_4$, at which time the cathode ray is dropped to a point $P_4$ for rescanning the upper frame during the fifth driving current cycle which concludes the period in which the scanning voltage is changed, the cathode ray reaching the point $F_5$. The second pair of frames have now moved down at the end of this period of five driving current cycles to the position shown on the right of Fig. 4, so that the cathode ray at this instant begins the scansion of a lower frame in a new pair.

Figure 5:
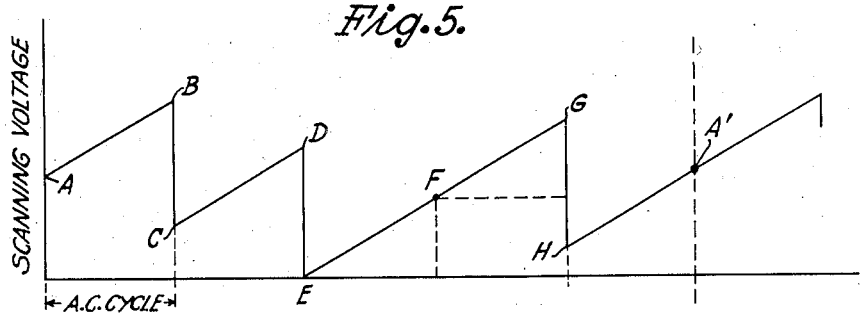
Fig. 5 is a diagrammatic view showing the variation with time of the irregular saw-toothed scanning voltage which is adapted to scan the frames in the position shown in Fig. 4.

Fig. 5 shows the broken line ABCDEGHA' that gives the instantaneous variation of the scanning voltage required for vertically deflecting the cathode ray to carry out the scanning illustrated in Fig. 4. In this figure, the scanning voltage is seen to increase linearly from a certain value denoted at A to a value denoted at B during the first driving current cycle. At the inception of the second driving current cycle, this scanning voltage is suddenly decreased to the low value denoted at C. During this second driving current cycle, the voltage increases at the same rate as in the first cycle, but the final value denoted at D is less than that at B because the starting value was less. At the inception of the third driving current cycle, the voltage drops to a third still lower value, shown at E. During this third cycle, the voltage increases linearly at exactly the same rate as in the first and second cycles until a value F is attained whereupon the voltage does not drop, but continues to increase from the value F throughout the fourth cycle until a value denoted at G is attained. At this instant, the voltage is again abruptly dropped to the low value denoted at H. From this value the voltage again increases linearly during the fifth driving current cycle at a rate exactly the same as that in the preceding cycles until the value A' is attained, and the cycle of voltage variation is thereupon repeated. From this, it is seen that the value of the voltage at A or A' may be obtained from a value of the voltage that remains constant during the driving current cycle to which is added a linearly varying component which imparts the value B at the end of the driving current cycle. In like manner, it is seen that the value of the voltage during the second driving current cycle may be attained by adding the same varying component to a constant component of the value denoted at C at the beginning of the second driving current cycle. In like manner, the value of the voltage during the third driving current cycle is obtained by adding the linearly varying component to a minimum constant value denoted at E at the beginning of the third cycle. The values at F and H similarly denote the values of the constant components at the beginning of the fourth and fifth cycles respectively.

Figure 6:
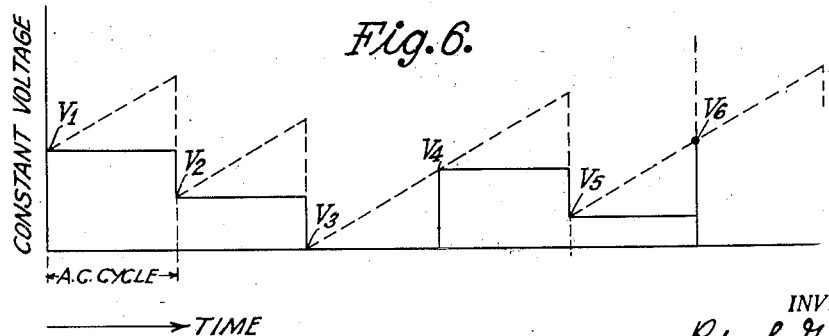
Fig. 6 shows the resolution of the voltages of Fig. 5 into a series of different constant components with an added varying component that give the irregular saw-toothed wave form shown in Fig. 5.

The sequence and relative values of the constant components during the five successive driving current cycles are shown in Fig. 6, i. e., the constant component is to have the value of voltage denoted at $V_1$ during the first driving current cycle in order to start the scanning with that depicted as A; that denoted by $V_2$ during the second driving current cycle; that denoted at $V_3$ in the third, etc.

It will be apparent from the foregoing that a frame of the film is traversed longitudinally by the scanning beam during each cycle of the sawtooth-scanning wave of Figs. 5 and 6. The frequency of this traversal may be termed "frame-scanning frequency" when considered from the point of view of the film. It may also be termed "field-scanning frequency" when considered from the point of view of successive traversals of an image field.

The commutator K, which is arranged to give constant components of a voltage corresponding to the values $V_1$, $V_2$, $V_3$, etc., is arranged to be driven in synchronism with the movement of the film 14. To this end, it is shown as mechanically coupled to the driving mechanism for the film, i. e., geared to be driven by the motor M. The sprockets 16 are preferably of such size as to move the film the required distance (at 24 frames per second) in 360 revolutions per minute. The motor M is then arranged to make the desired number of driving revolutions. Since the motor is shown directly coupled to sprocket 16, it should rotate at 360 R. P. M. The gearing, in consequence, between motor and commutator should give a speed ratio of 1:2, so that the commutator K will rotate at 720 R. P. M., hence making one revolution while the film is moving two frames through the scanning fields. One revolution of the commutator K, therefore, corresponds to the period of five driving current cycles and its circumference is divided into five segments arranged successively to give values of the voltage indicated at Fig. 6, namely, those denoted $V_1$, $V_2$, $V_3$, etc. To obtain the variable component desired in each of the driving current cycles, the values of elements C and R are suitably adjusted in the discharge circuit of tube 21.

Figure 2:
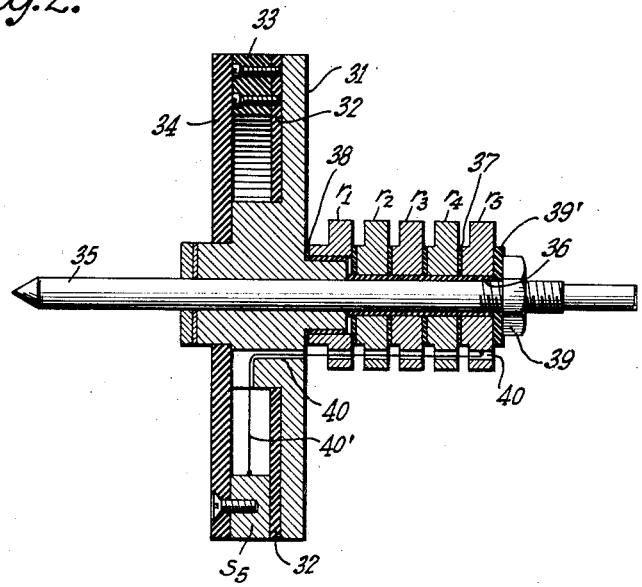
Fig. 2 is an enlarged detailed view of the commutator shown in Fig. 1.
Figure 3:
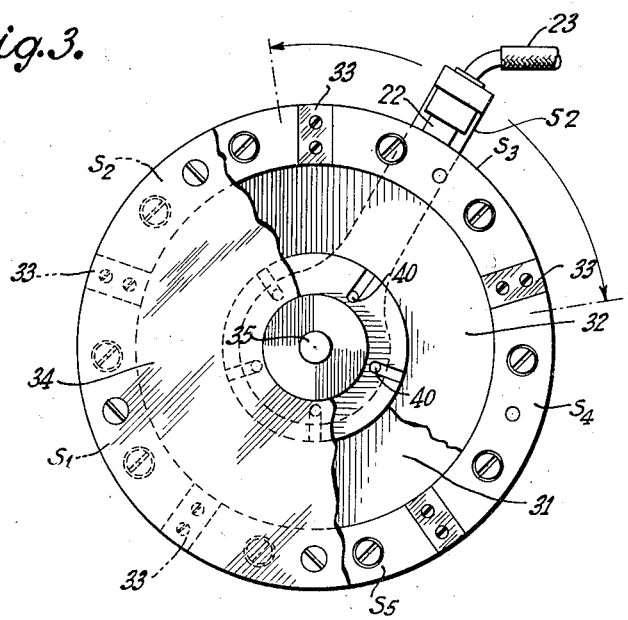
Fig. 3 is a similar view showing the commutator illustrated in Fig. 2, but in a plane at right angles to that shown in Fig. 2.

Any suitable construction of the commutator which gives components in the desired sequence may be employed. As shown in Figs. 1, 2, and 3, there are five conducting segments denoted respectively $s_1$, $s_2$, $s_3$, $s_4$, and $s_5$, which subtend equal angles about the circumference of the main commutator drum, these conducting segments being mounted on drum portion 31 but spaced therefrom by an interposed disk of insulation 32. Each of conducting segments $s_1$, $s_2$, $s_3$, etc. is separated peripherally from the adjacent conducting segment by interposed segments of insulation 33. The end of the commutator is preferably closed by means of a relatively thick disk of insulation as shown at 34. The commutator disk 31 is mounted on and rotates with the shaft 35 which is keyed to the gearing at 30 and is mounted in suitable bearings (not shown in the interests of clearness of illustration in the drawings). Over the shaft 35 is pressed a sleeve of insulating material 36. Over this sleeve in turn is pressed a series of collecting rings $r_1$, $r_2$, $r_3$, $r_4$, and $r_5$, which are separated by inserted insulating washers 37, there being also an insulating washer at 38 that separates the end ring $r_1$ from the disk 31. This assembly of rings and washers is held rigidly in place by means of a locknut 39 and washer 39' that fit over the end of the shaft 35, the lock-nut making screw-threaded engagement with a shoulder located on the shaft at a point where the insulating sleeve terminates. This assembly is preferably tunneled out by one or more passages 40 running through the several rings and the disk 31 at points adjacent to the shaft 35 so that a series of conductors 40' may be laid in, for electrically connecting the conducting segments with the collecting rings. In the arrangement shown, the ring $r_1$ is electrically connected to the segment $s_1$, the ring $r_2$ to the segment $s_2$, etc. A series of brushes 41, 42, 43, 44, and 45 bear on the rings $r_1$, $r_2$, $r_3$, $r_4$, and $r_5$, respectively, and have conductors leading to points of suitable potential, such as points on a potentiometer or high resistance bridging a source of current P. The conductors from the brushes 41, 42, 43, etc. lead to suitable terminal points on the resistance at P, for example, the brush 41 is connected to the point $t_5$ which has the highest potential value along the resistance. Brush 42, however, is connected to point $t_3$ which gives an intermediate or half-way value of the potential tapped off of the resistance. Brush 43 is connected at $t_1$, which gives the lowest value tapped off, while brush 44 is connected to point $t_4$, and brush 45 to point $t_2$. A swinging bracket 52 supports the brush 22 so as to be adjustable about the circumference of the commutator through a limited arc. By this means, the phase or instant of change in the potential applied may be adjusted. The arc spanned by the brush 22 is made to be slightly less than that subtended by an insulating segment, so as to avoid short-circuiting.

In operation, it is seen that when the motor M is set running to drive the film and the tube 10 is connected to give a scanning light spot, the scanning voltages are then applied to the deflecting plates 17 so as to cause the scanning light spot to scan two frames in every scanning cycle, or period of $\frac{1}{12}$ second, in accordance with the scanning scheme illustrated in Fig. 4; the instantaneous voltages on the plates 17 being depicted in Fig. 5. The commutator K is seen to make one rotation during the period of $\frac{1}{12}$ second when two frames pass through the scanning field. Assuming that collector-brush 22 is at the initial point of the segment $s_1$, this segment is seen to be in conducting relation with ring $r_1$, brush 41, and point $t_5$ of the resistance across the source of potential P. This impresses a control voltage on the grid of tube 20 which gives a voltage of the value $V_1$ at the initial instant across the plates 17. During the interval of the driving current cycle, the oscillator tube 21 supplies additional voltage which grows linearly until a value proportional to that depicted at B is attained when the tube discharges and reduces the built-up voltage to the value next instantaneously impressed by the commutator. Substantially simultaneously with the termination of the first driving current cycle and the beginning of the second driving current cycle the brush 22 passes on to the segment $s_2$ which is electrically connected to ring $r_2$. Brush 42, and hence point $t_3$, supply another constant voltage component to the grid of tube 20 so that a voltage of $V_2$ is now impressed across the plates 17. During the duration of the second driving current cycle, tube 21 causes the voltage across plates 17 to grow to a value proportional to that indicated at point D in Fig. 5, when the tube will again discharge and reduce the voltage to the minimum value. At this instant, collector-brush 22 passes on to the segment $s_3$. This latter is in conducting relation with ring $r_3$, brush 43, and point $t_1$ on the potentiometer. In consequence, a constant minimum valued voltage component is applied to the grid of tube 20 to impress a voltage of the value $V_3$ across the plates 17. During the ensuing third driving current cycle, the tube 21 again builds voltage to a value proportional to that indicated by the point F in Fig. 5, when it again discharges. At this instant, however, the brush 22 passes on to segment $s_4$, which is in conducting relation with ring $r_4$ and brush 44, the latter being connected to point $t_4$ on the potentiometer. As a result, another constant voltage component is applied to the grid of tube 20 so that a voltage of value $V_4$, which is substantially the same in value as that at F, is instantaneously applied across the plates 17. During the ensuing fourth driving current cycle, the voltage again grows linearly by the component supplied through tube 21 so that at the end of this driving current cycle, a voltage of a value denoted by the point G in Fig. 5 is applied across the plates 17. At the same instant, the tube 21 again discharges to reduce the voltage. The fifth driving current cycle, however, is begun at this instant, brush 22 passing on to segment $s_5$ of the commutator. Segment $s_5$ in consequence is in conducting relation with ring $r_5$, brush 45, and point $t_2$ on the potentiometer. As a result, another constant current voltage component is impressed upon the grid of tube 20, so that a voltage of value $V_5$ is impressed across the plates 17. During the fifth driving current cycle, which completes the period of $\frac{1}{12}$ second, the voltage again grows in value by reason of the components supplied by the tube 21 so that a value denoted by the value $V_6$ in Fig. 6 is attained. This value is of the same value as $V_1$, and the commutator starts another revolution and the cycle of scanning voltage changes is repeated.

While the scanning cathode ray tube above described employs electrostatic means for deflecting the cathode ray, it will be understood that electromagnetic means may be likewise employed. In such case, instead of plates 17, coils would be substituted and suitably located, the coils being supplied with current from the tubes 20 and 21, the current varying in amount in accordance with the potential changes desired. As will be understood by those skilled in the art, in the case of electromagnetic deflecting coils the wave forms above described as voltage wave forms should be understood as current wave forms, and that the voltage applied to the coils must be suitable to produce such a current wave. Means for effecting the necessary modification are well known in the art. The term "sawtooth-scanning voltage" used in the claims will be understood to include not only a sawtooth voltage wave as used for electrostatic deflection, but also the voltage which produces a corresponding sawtooth current wave in electromagnetic deflection coils, the resultant scanning being the same in both cases.

While the cathode ray tube here depicted also has a fluorescent screen and employs a beam of electrons that is relatively small in transverse dimensions, when compared with the longitudinal dimension, it will be understood that this is merely exemplary and the term "cathode ray tube" or "electronic scanning device" is intended to include all tubes that use an evacuated envelope and are provided with an electrode structure giving a beam of electrons that is deflected, including tubes in which the cathode is of photoelectric material.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In an electronic film-scanning system, apparatus which comprises, in combination, an electronic scanning device having elements for deflecting an electronic beam in one direction, a film-moving mechanism positioned to support a film in cooperative relation with said scanning device and adapted to move the film with uniform speed, an oscillator for producing a sawtooth-scanning voltage which varies from an initial value to a final value during each of a plurality of consecutive scanning periods and returns abruptly to said initial value at the end of each scanning period, additional means for producing a voltage having successively a plurality of different cyclically recurring constant values, each of said constant values being at least one scanning period of said sawtooth scanning voltage in duration, and means for applying said voltages to the deflecting elements of said scanning device to deflect the beam in said one direction.

2. In an electronic film-scanning system, apparatus which comprises, in combination, a scanning device having elements for deflecting an electronic beam in one direction, a film-moving mechanism positioned to support a film in cooperative relation with said scanning device and adapted to move said film with uniform speed, means including an oscillator for producing a sawtooth-scanning voltage which varies from an initial value to a final value during each of a plurality of consecutive scanning periods and returns abruptly to said initial value at the end of each scanning period, means including a commutator for producing a voltage having successively a plurality of different cyclically recurring constant values, each of said constant values being at least one scanning period of said sawtooth-scanning voltage in duration, means for applying said voltages to the deflecting elements of said scanning device to deflect the beam in said one direction, and means for driving said commutator and said film-moving mechanism synchronously.

3. In an electronic film-scanning system, apparatus which comprises, in combination, a scanning device having elements for deflecting an electronic beam in one direction, a film-moving mechanism positioned to support a film in cooperative relation with said scanning device and adapted to move said film longitudinally in said one direction with uniform speed at a certain number of frames per second, an oscillator for producing a longitudinal sawtooth-scanning voltage which varies from an initial value to a final value during each of a plurality of consecutive longitudinal scanning periods and returns abruptly to said initial value at the end of each scanning period, commutator means for producing a voltage having successively a plurality of different cyclically recurring constant values in a preassigned sequence, each of said constant values being at least one scanning period of said sawtooth scanning voltage in duration, said sequence being such that traversal of said frames during scanning takes place at a number of frames per second different from said certain number of frames per second, means for applying said voltages to the deflecting elements of said scanning device to deflect the beam in said one direction, and means for driving said commutator and said film-moving mechanism synchronously.

4. In an electronic film-scanning system, apparatus which comprises, in combination, a scanning device having elements for deflecting an electronic beam in one direction, a film-moving mechanism positioned to support a film in cooperative relation with said scanning device and adapted to move said film longitudinally in said one direction with uniform speed at a rate of 24 frames per second, an oscillator for producing a longitudinal sawtooth-scanning voltage which varies from an initial value to a final value during each of a plurality of consecutive longitudinal scanning periods and returns abruptly to said initial value at the end of each scanning period, commutator means for producing a voltage having successively a plurality of different cyclically recurring constant values in a preassigned sequence, each of said constant values being at least one scanning period of said sawtooth-scanning voltage in duration, said sequence and values and said longitudinal scanning periods being such that said frames are scanned at a rate of 60 traversals per second, means for applying said voltages to the deflecting elements of said scanning device to deflect the beam in said one direction, and means for driving said commutator and said film-moving mechanism synchronously.

5. In an electronic film-scanning system, apparatus which comprises, in combination, a film-moving mechanism adapted to move a film longitudinally with uniform speed and at a selected number of frames per second, an electronic scanning device positioned in cooperative relationship with said film-moving mechanism and having deflecting elements for scanning said film in transverse and longitudinal directions, means for energizing the transverse deflecting elements at line scanning frequency; and means for energizing the longitudinal deflecting elements at frame scanning frequency including an oscillator for producing a sawtooth-scanning voltage which varies from an initial value to a final value during each of a plurality of consecutive longitudinal scanning periods and returns abruptly to said initial value at the end of each longitudinal scanning period, commutator means for producing a voltage having successively a plurality of different cyclically recurring constant values in a preassigned sequence, each of said constant values being at least one longitudinal scanning period in duration, the magnitude and period of the sawtooth-scanning voltage and the magnitude and sequence of the said constant values being selected to traverse longitudinally a film-frame during a longitudinal scanning period and to effect a number of longitudinal traversals of the film frames per second different from the number of frames per second at which the film passes through the film-moving mechanism.

6. In an electronic film-scanning system, apparatus which comprises, in combination, a scanning device having elements for deflecting an electronic beam in one direction, a film-moving mechanism positioned to support a film in cooperative relation with said scanning device and adapted to move said film with uniform speed, a commutator having a plurality of segments maintained, respectively, at a plurality of different constant potentials, means for deriving from the potentials on said segments a first voltage having successively a like plurality of different constant values, each continuing throughout one of a like plurality of consecutive scanning periods constituting a complete scanning cycle and recurring cyclically thereafter, an oscillator for producing a sawtooth-scanning voltage which varies from an initial value to a final value during each of said scanning periods and returns abruptly to said initial value at the end of said scanning period, means for applying said voltages to the deflecting elements of said scanning device to deflect the beam in said one direction, and means for driving said commutator and said film-moving mechanism synchronously.

7. In an electronic film-scanning system, apparatus which comprises, in combination, a film-moving mechanism adapted to move a film longitudinally with uniform speed and at a selected number of frames per second, an electronic scanning device positioned in cooperative relationship with said film-moving mechanism and having deflecting elements for scanning said film in transverse and longitudinal directions, means for energizing the transverse deflecting elements at line-scanning frequency; and means for energizing the longitudinal deflecting elements at frame-scanning frequency including an oscillator for producing a sawtooth-scanning voltage which varies from an initial value to a final value during each of a plurality of consecutive longitudinal scanning periods and returns abruptly to said initial value at the end of each longitudinal scanning period, a commutator having a plurality of segments maintained, respectively, at a plurality of different constant potentials, means for deriving from the potentials on said segments a first voltage having successively a like plurality of different constant values, each continuing throughout one of a like plurality of consecutive longitudinal scanning periods constituting a complete scanning cycle and recurring cyclically thereafter, an amplifier having input and output circuits, said input circuit being connected to the last-mentioned voltage, said oscillator and the output circuit of said amplifier being connected to simultaneously energize the longitudinal deflecting elements of the scanning device, and means for driving said commutator and said film-moving mechanism synchronously.

8. In an electronic tube scanning system including deflection means for deflecting in one direction an electronic beam in said tube, the combination which comprises an oscillator for producing a substantially uniformly recurring sawtooth-scanning electric wave which varies from an initial value to a final value during each scanning period thereof, a commutator-controlled generator for producing a cyclically recurring scanning electric wave having more than two successive different magnitudes within a cycle thereof, the sequence of said magnitudes within said cycle being other than the natural numerical progression and each of said magnitudes remaining substantially constant throughout at least one cycle of said sawtooth-scanning electric wave, and means for impressing both said scanning waves on said deflection means to deflect said electronic beam in said one direction.

9. In electronic film-scanning apparatus, the combination which comprises an electronic scanning device, a film-feeding mechanism positioned to support a film in cooperative relation with said scanning device and adapted to feed the film longitudinally at a uniform speed, deflection means associated with said scanning device for deflecting an electronic beam therein to scan said film in the direction of movement thereof, a generator for producing a sawtooth-scanning electric wave having a periodicity substantially different from the periodicity at which film-frame areas of said film are fed through said film-feeding mechanism, a commutator-controlled generator for producing an additional cyclically recurring scanning electric wave, means for impressing said waves on said deflection means, means for driving said commutator and said film-feeding mechanism in synchronism so that a synchronous relationship is maintained between said additional cyclically recurring scanning electric wave and the frequency at which film-frame areas are fed through the film-feeding mechanism, the wave form of said additional cyclically recurring scanning electric wave being selected to displace longitudinally of the film the successive scansions produced by said sawtooth-scanning electric wave in amounts to compensate for the film movement and cause longitudinal scansions of the film to begin substantially at longitudinally corresponding portions of the same and successive film-frame areas.

10. In electronic film-scanning apparatus, the combination which comprises an electronic scanning device, a film-feeding mechanism positioned to support a film in cooperative relation with said scanning device and adapted to feed the film longitudinally at a uniform speed, means associated with said scanning device for scanning said film at line scanning frequency in lines extending in a direction lateral to the direction of movement of the film, deflection means associated with said scanning device for deflecting an electronic beam therein to scan said film in the direction of movement thereof, a generator for producing a sawtooth-scanning electric wave having a periodicity substantially different from the periodicity at which film-frame areas of said film are fed through said film-feeding mechanism, a commutator-controlled generator for producing an additional electric wave having a plurality of successive different magnitudes each of which remains substantially constant throughout at least one cycle of said sawtooth-scanning electric wave, means for impressing both said electric waves on said deflection means, means for driving said commutator and said film-feeding mechanism in synchronism so that a synchronous relationship is maintained between said additional electric wave and the frequency at which film-frame areas of the film are fed through the film-feeding mechanism, said magnitudes being selected to displace longitudinally of the film the successive scansions produced by said sawtooth-scanning electric wave in amounts to compensate for the film movement and cause longitudinal scansions of the film to begin substantially at longitudinally corresponding portions of the same and successive film-frame areas.

11. In an electronic tube scanning system, the combination which comprises an electronic scanning device, means associated with said scanning device for deflecting an electronic beam therein in line-scanning direction at line-scanning frequency, deflection means associated with said scanning device for deflecting said electronic beam in a field-scanning direction substantially perpendicular to said line-scanning direction, an electronic oscillator for producing a substantially uniformly recurring sawtooth-scanning electric wave of field-scanning frequency, a commutator-controlled generator for producing a cyclically recurring electric wave having a plurality of successive different constant magnitudes within a cycle thereof, each of said magnitudes remaining substantially constant throughout at least one field-scanning period of said sawtooth-scanning electric wave, and means for impressing both said electric waves on said deflection means to deflect said electronic beam in the field-scanning direction.

PETER C. GOLDMARK.